United States Patent
Zheng et al.

(10) Patent No.: US 11,039,153 B2
(45) Date of Patent: Jun. 15, 2021

(54) EFFICIENT PROCESSING OF TRANSLUCENT OBJECTS IN VIDEO KEYING

(71) Applicant: ATI Technologies ULC, Markham (CA)

(72) Inventors: Yubao Zheng, Markham (CA); Gabor Sines, Markham (CA)

(73) Assignee: ATI Technologies ULC, Markham (CA)

(*) Notice: Subject to any disclaimer, the term of this patent is extended or adjusted under 35 U.S.C. 154(b) by 17 days.

(21) Appl. No.: 16/428,909

(22) Filed: May 31, 2019

(65) Prior Publication Data

US 2020/0382801 A1 Dec. 3, 2020

(51) Int. Cl.

| | |
|---|---|
| *G06T 7/00* | (2017.01) |
| *H04N 19/23* | (2014.01) |
| *G06T 7/194* | (2017.01) |
| *H04N 19/186* | (2014.01) |
| *G06K 9/00* | (2006.01) |

(52) U.S. Cl.
CPC ......... *H04N 19/23* (2014.11); *G06K 9/00744* (2013.01); *G06T 7/194* (2017.01); *H04N 19/186* (2014.11)

(58) Field of Classification Search
CPC ........... G06T 7/194; H04N 9/75; H04N 5/275
See application file for complete search history.

(56) References Cited

U.S. PATENT DOCUMENTS

| | | | |
|---|---|---|---|
| 6,571,012 B1* | 5/2003 | Pettigrew | H04N 9/75 348/592 |
| 7,508,455 B2* | 3/2009 | Liu | H04N 9/75 348/587 |

OTHER PUBLICATIONS

Levin, A., et al. "A Closed Form Solution to Natural image Matting", IEEE Transactions on Pattern Analysis and Machine Intelligence, 30(2):228-242, Feb. 2008.

* cited by examiner

*Primary Examiner* — Brian Werner
(74) *Attorney, Agent, or Firm* — Volpe Koenig (57) ABSTRACT

A video keying processing device is provided which comprises memory configured to store data and a processor configured to determine, which pixel portions, in a YUV color space of a first video comprising a foreground object and a background color, represent the foreground object and the background color of the first video. The processor is also configured to, for each pixel portion of the first video determined to represent the foreground object and the background color, convert YUV values of the pixel portion to red-green-blue (RGB) color component value and determine a blended display value for each RGB color component of the pixel portion based on a blending factor. The processor is also configured to generate a composite video for display using the blended display values of each pixel portion determined to represent the foreground object and the background color.

20 Claims, 5 Drawing Sheets

EFFICIENT PROCESSING OF TRANSLUCENT OBJECTS IN VIDEO KEYING

BACKGROUND

Video keying, or chroma keying, is widely used in the broadcasting, movie and video gaming industries. Video keying involves the compositing (e.g., layering) of video data from two video streams based on color hues. For example, a first video stream, which includes video of a foreground object (e.g., a news anchor) shot in front of a background color (e.g., green screen), is acquired. In the composite video, the background color of the first video is replaced with background content, such as a second video (typically shot prior to the first video and at a different location from the first video) or computer generated imagery (CGI).

BRIEF DESCRIPTION OF THE DRAWINGS

A more detailed understanding can be had from the following description, given by way of example in conjunction with the accompanying drawings wherein.

DETAILED DESCRIPTION

As used herein, a program includes any sequence of instructions (e.g., an application, a module (e.g., a stitching module for stitching captured image data), a kernel, a work item, a group of work items and the like) to be executed using one or more processors to perform procedures or routines (e.g., operations, computations, functions, processes and jobs). Processing of programmed instructions includes one or more of a plurality of processing stages, such as but not limited to fetching, decoding, scheduling for execution and executing the programmed instructions. Processing of data (e.g., video data) includes for example, sampling data, encoding data, compressing data, reading and writing data, storing data, converting data to different formats (e.g., color spaces) and performing calculations and controlling one or more components (e.g., encoder and decoder) to process data.

As used herein, a pixel is a portion of a video (e.g., portion of image or frame) or computer graphic for display. A pixel portion includes any number of pixels, such as for example, a single pixel or multiple pixels (e.g., pixel block, macro block, a transform block, a row of pixels and a column of pixels).

To replace the background color of the first video with the second video (or CGI), the background color of the first video is first separated from the foreground object of the first video. Due to lighting and other environmental factors affecting the background color, it is often challenging to determine which pixels correspond to the background color and which correspond to the foreground object. Further, in some examples, the foreground object or portion of the foreground object is translucent (i.e., partially transparent). Pixels corresponding to the translucent portion of the video include a blend of both the background color and the foreground object. Determining values for pixel portions which correspond to the translucent portion of the video, however, is an even greater challenge. Conventional techniques for handling translucent objects include complicated algorithms which increase latency and power consumption. For example, closed form solution techniques can take 40 seconds or more just to generate a mask for a 1920×1080 image.

The present application provides processing devices and methods for efficiently processing video data which includes translucent objects in a video keying process. The devices and methods described herein accurately determine values of pixels corresponding to translucent portions of a video with less latency and reduced power consumption than conventional video keying techniques. For example, devices and methods described herein accurately perform the keying process for a 4 k (3840×2160) video frame in milliseconds.

Pixel portions of a first video are separated, in a YUV color space, into background portions, foreground portions and unknown portions, for example, by generating an alpha mask using a UV color map. One of three corresponding values are assigned to each of the background, foreground and unknown pixel portions (which can include pixel portions corresponding to a translucent object) to be represented as a transparent pixel portion, an opaque (i.e., solid) pixel portion and a blended pixel portion, respectively. Alpha values (i.e., blending factor values) of the pixel portions corresponding to the unknown portions (i.e., unknown pixel portions) are efficiently determined by converting the YUV values of the unknown pixel portions to red-green-blue (RGB) values and using assumed conditions.

A video keying processing device is provided which includes memory configured to store data and a processor configured to determine, which pixel portions, in a YUV color space of a first video comprising a foreground object and a background color, represent the foreground object and the background color of the first video. For each pixel portion of the first video determined to represent the foreground object and the background color, the processor is also configured to convert YUV values of the pixel portion to RGB color component values and determine a blended display value for each RGB color component of the pixel portion based on a blending factor. The processor is also configured to generate a composite video for display using the blended display values of each pixel portion determined to represent the foreground object and the background color.

A video keying processing method is also provided which includes determining, which pixel portions, in a YUV color space of a first video comprising a foreground object and a background color, represent the foreground object and the background color of the first video. The method also includes, for each pixel portion of the first video determined to represent the foreground object and the background color, converting YUV values of the pixel portion to RGB color component values, determining a blending factor of the pixel portion based on the RGB color component values and determining a blended display value for each RGB color component of the pixel portion based on the blending factor. The method further includes generating a composite video for display using the blended display values of each pixel portion determined to represent the foreground object and the background color.

A video keying processing device is also provided which includes memory configured to store data and a processor configured to receive a first video, comprising a foreground object and a background color, and background display content comprising at least one of a second video and CGI. The processor is also configured to generate, in a YUV color space using a key color representing the background color, an alpha mask to separate pixel portions of the first video into pixel portions representing the foreground object, pixel portions representing the background color and pixel portions representing the foreground object and the background color. The processor is also configured to, for each pixel portion representing the foreground object and the background color, determine, in an RGB color space, a blending factor using the key color and color values of the pixel portion and determine a blended display value for each RGB color component of the pixel portion based on the blending factor and the key color. The processor is further configured to generate a composite video for display using the blended display values of each pixel portion determined to represent the foreground object and the background color.

Figure 1:
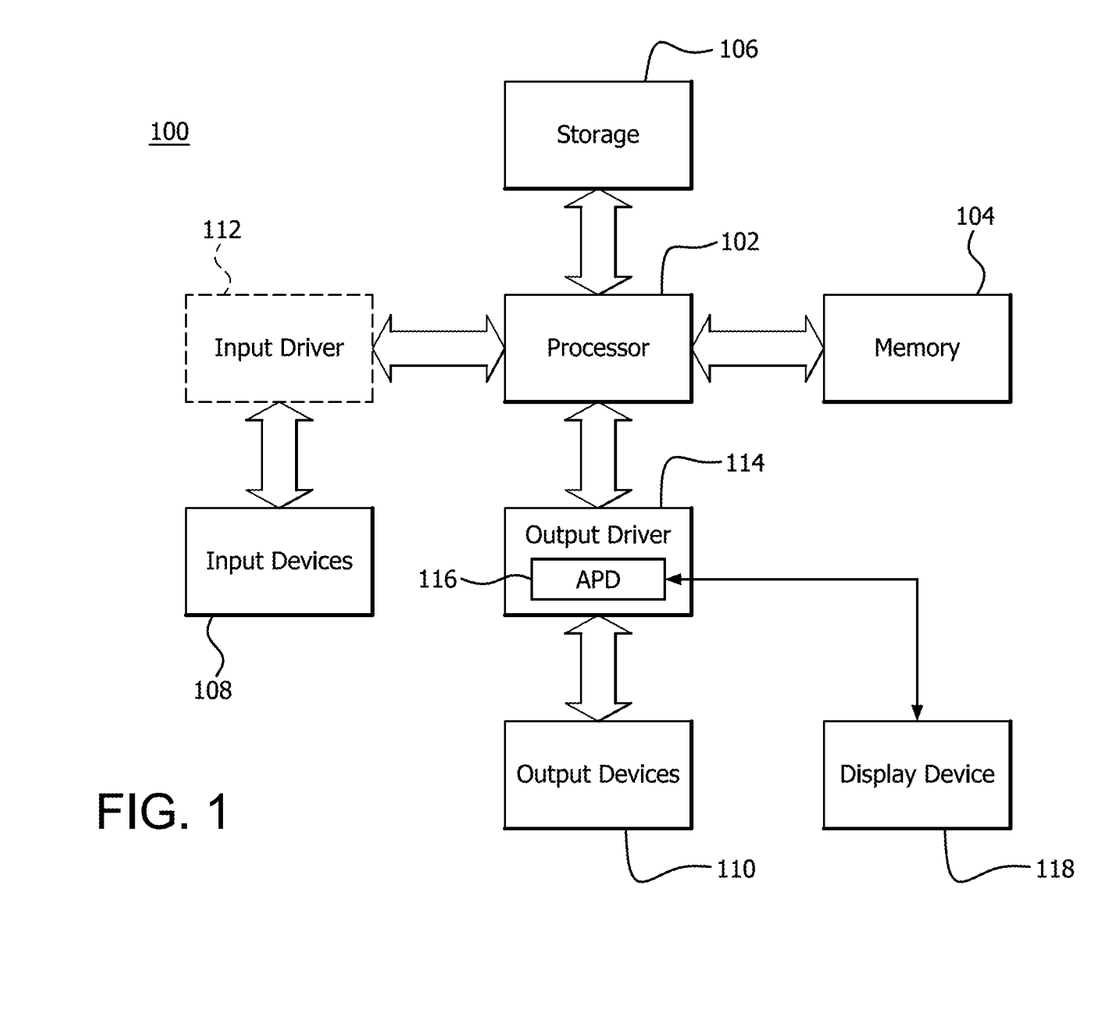
FIG. 1 is a block diagram of an example device in which one or more features of the disclosure can be implemented.

FIG. 1 is a block diagram of an example device 100 in which one or more features of the disclosure can be implemented. The device 100 can include, for example, a computer, a gaming device, a handheld device, a set-top box, a television, a mobile phone, or a tablet computer. The device 100 includes a processor 102, a memory 104, storage 106, one or more input devices 108, and one or more output devices 110. The device 100 can also optionally include an input driver 112 and an output driver 114. It is understood that the device 100 can include additional components not shown in FIG. 1.

In various alternatives, the processor 102 includes one or more processors, such as a central processing unit (CPU), a graphics processing unit (GPU), or another type of compute accelerator, a CPU and GPU located on the same die, or one or more processor cores, wherein each processor core can be a CPU or a GPU or another type of accelerator. Multiple processors are, for example, included on a single board or multiple boards. Processor on one or more boards. In various alternatives, the memory 104 is be located on the same die as the processor 102, or is located separately from the processor 102. The memory 104 includes a volatile or non-volatile memory, for example, random access memory (RAM), dynamic RAM, or a cache.

The storage 106 includes a fixed or removable storage, for example, a hard disk drive, a solid state drive, an optical disk, or a flash drive. The input devices 108 include, without limitation, one or more image capture devices (e.g., cameras), a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include, without limitation, one or more serial digital interface (SDI) cards, a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. The input driver 112 and the output driver 114 include, for example, one or more video capture devices, such as a video capture card (e.g., an SDI card). As shown in FIG. 1, the input driver 112 and the output driver 114 are separate driver devices. Alternatively, the input driver 112 and the output driver 114 are integrated as a single device (e.g., an SDI card), which receives captured image data and provides processed image data (e.g., panoramic stitched image data) that is stored (e.g., in storage 106), displayed (e.g., via display device 118) or transmitted (e.g., via a wireless network).

It is noted that the input driver 112 and the output driver 114 are optional components, and that the device 100 will operate in the same manner if the input driver 112 and the output driver 114 are not present. In an example, as shown in FIG. 1, the output driver 114 includes an accelerated processing device ("APD") 116 which is coupled to the display device 118. The APD is configured to accept compute commands and graphics rendering commands from processor 102, to process those compute and graphics rendering commands, and to provide pixel output to display device 118 for display. As described in further detail below, the APD 116 includes one or more parallel processing units configured to perform computations in accordance with a single-instruction-multiple-data ("SIMD") paradigm. Thus, although various functionality is described herein as being performed by or in conjunction with the APD 116, in various alternatives, the functionality described as being performed by the APD 116 is additionally or alternatively performed by other computing devices having similar capabilities that are not driven by a host processor (e.g., processor 102) and configured to provide graphical output to a display device 118. For example, it is contemplated that any processing system that performs processing tasks in accordance with a SIMD paradigm may be configured to perform the functionality described herein. Alternatively, it is contemplated that computing systems that do not perform processing tasks in accordance with a SIMD paradigm performs the functionality described herein.

Figure 2:
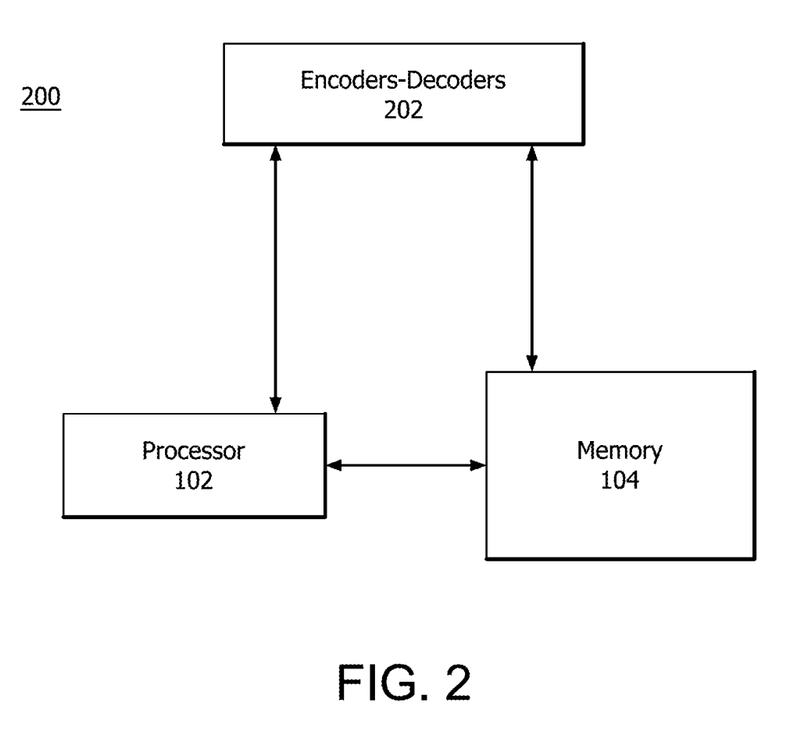
FIG. 2 is a block diagram illustrating exemplary components of a processing device in which one or more features of the disclosure can be implemented.

FIG. 2 is a block diagram illustrating exemplary components of a processing device 200 in which one or more features of the disclosure can be implemented. Processing device 200 is used to perform efficient keying of video data including translucent objects, as described in more detail below.

As shown in FIG. 2, processing apparatus 200 includes processor 102, memory 104 and encoder-decoder 202. Features of the disclosure include using one or more encoders-decoders. Encoder-decoder 202 includes, for example, a separate encoder and decoder or a combined encoder-decoder (i.e., a CODEC)). Processor 102 is in communication with memory 104 and is configured to process data (e.g., video data) using the memory 104 to execute the program. Encoder-decoder 202 is, for example, controlled by processor 102 to encode and decode each portion of data. Alternatively, encoder-decoder 202 includes a dedicated processor to encode the data. Encoder-decoder 202 is, for example, implemented in hardware, software or a combination of hardware and software.

Figure 3:
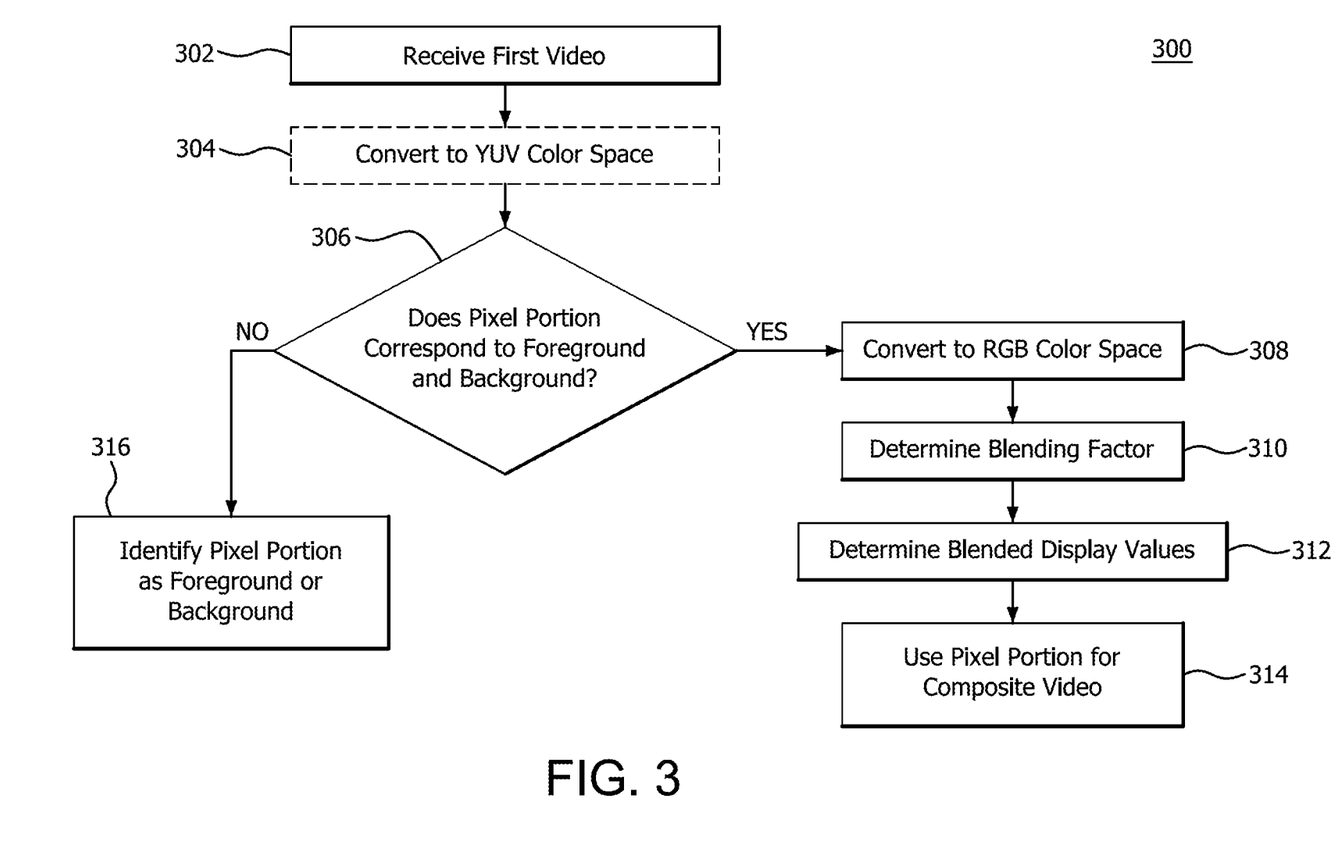
FIG. 3 is a flow diagram illustrating an example video keying method according to features of the disclosure.

FIG. 3 is a flow diagram illustrating an example video keying method according to features of the disclosure. The video keying method illustrated in FIG. 3 improves the performance of processing video data in which the foreground object or a portion of the foreground object of the first video stream is translucent (i.e., partially transparent). As described in more detail below, the video keying method includes separating the first video into pixel portions representing the foreground object, pixel portions representing the background color and pixel portions representing both the foreground object and the background color (e.g., corresponding to a translucent foreground object in the video). A display value is then assigned to each pixel portion representing both the foreground object and the background color based on a blending factor determined from RGB values of the pixel portions and a key color. A composite video is generated for display by blending each pixel portion having the determined display value with background display content.

As shown at block 302 in FIG. 3, the method 300 includes receiving a first video. Typically, the first video includes a foreground object that is shot (i.e., filmed or recorded) in front of a background color screen (e.g., green screen or blue screen). Accordingly, the first video data includes at least one foreground object (e.g., a person) and a background color (e.g., green). In the examples described herein, the background color is green. Features of the disclosure can be implemented, however, using any background color.

Pixel portions in a video stream are typically encoded in a RGB color space. In a RGB color space, three channels (R channel, G channel, and B channel) are used to represent the colors of the pixel portions. The pixel portions in the video stream are typically encoded, however, using a YUV color space to reduce bandwidth and power consumption. The YUV color space also includes 3 channels. In the YUV color space, however, one channel (i.e., the Y channel) is used to represent the luminance (i.e., brightness information) of the pixel portions and the other two channels (i.e., the U and V channels) are used to represent the chrominance (color information) of the pixel portions. Because the human eye is less sensitive to color than luminance, the luminance of the pixel portions is represented in high resolution while the color of the pixel portions is represented in low resolution and can be bandwidth-reduced, subsampled, compressed, or otherwise treated separately for improved efficiency.

In some examples, the received first video (i.e., the input video) is in a YUV color space (i.e., the pixel portions are encoded in YUV color space). When the first video is in a YUV color space, the method proceeds directly from block 302 to decision block 306. In other examples, the video data of the input video is received in a RGB color space (i.e., the pixel portions in the input image are encoded in RGB color space). When the input video is in a RGB color space, the video data is converted to YUV color space, as shown in phantom at block 304 in FIG. 3 before proceeding to decision block 306.

As shown at decision block 306 in FIG. 3, the method 300 includes determining whether a pixel portion of the first video corresponds to both the foreground object and the background color. That is, it is determined whether a pixel portion of the first video includes YUV color space information representing both the foreground object and the background color. Pixel portions which represent both the foreground object and the background color can correspond to a translucent foreground object or a translucent portion of a foreground object in the video.

Figure 4:
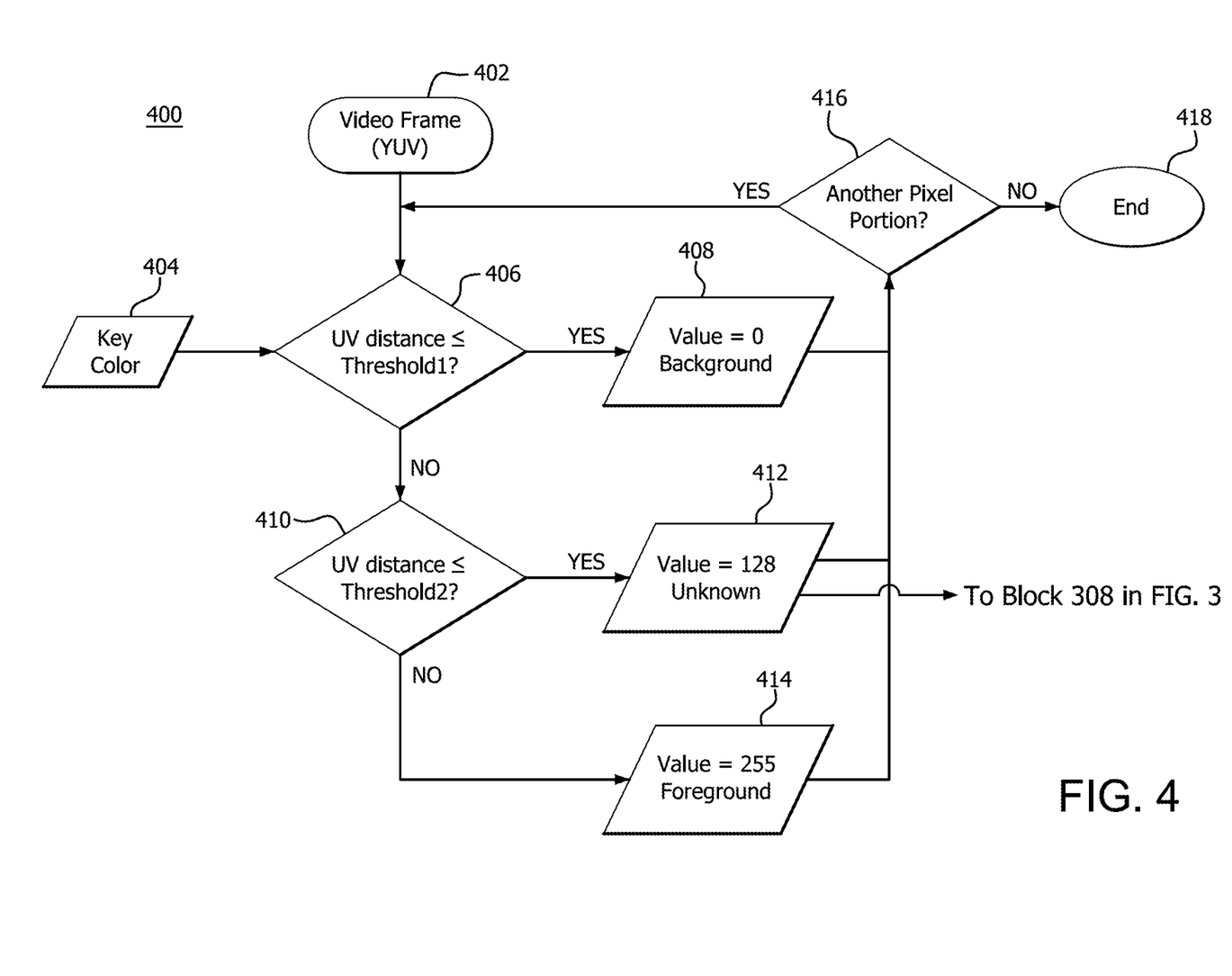
FIG. 4 is a flow diagram illustrating an example method of generating an alpha mask for use with one or more features of the disclosure.

FIG. 4 is a flow diagram illustrating an example method 400 for determining whether a pixel portion (i.e., one or more pixels) corresponds to both the foreground object and the background color. The example method 400 includes generating an alpha mask which provides three different values to identify three different pixel portion types (i.e., pixel portions which represent the background color, pixel portions which represent the foreground object, and pixel portions which represent both the background color and the foreground object.

Figure 5:
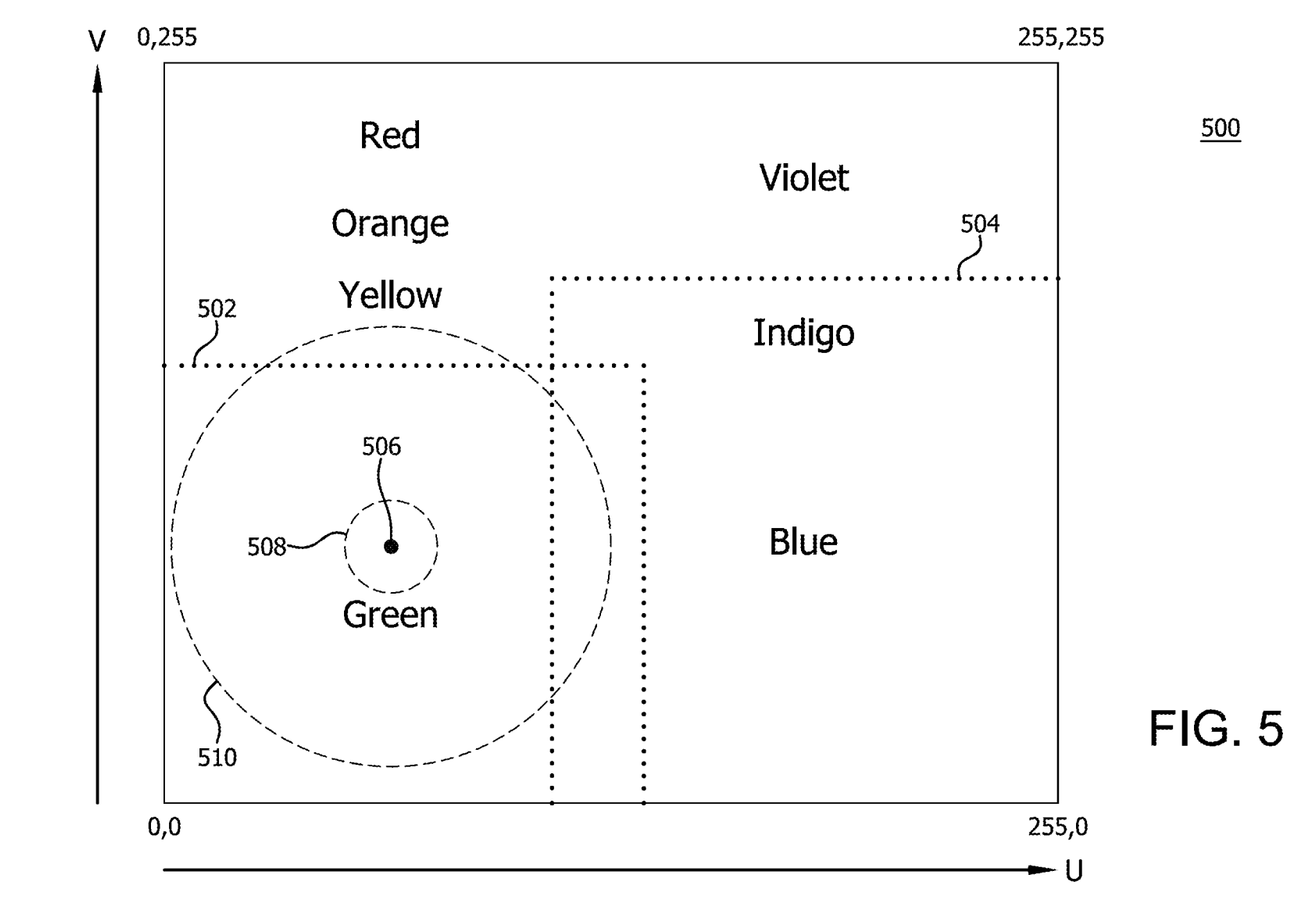
FIG. 5 is an illustration of an example UV color map for use with one or more features of the disclosure.

The alpha mask in the example method 400 is generated using the example UV color map 500 shown in FIG. 5. As shown in FIG. 5, the example UV color map 500 is a two dimensional (2D) map which includes values between 0 and 255 for the V color channel and the U color channel. The values for the V color channel are represented along the vertical axis and the values for the U color channel are represented along the horizontal axis. The values 0-255 are exemplary values based on an 8 bit per pixel (bpp) encoding. Value ranges for the V and U color channels can include value ranges different from the 0-255 value range shown in FIG. 5 based on the bpp encoding used.

The example UV color map 500 includes different overlapping color areas. For example, the green color area 502 includes a plurality of different green color hues and the blue color area 504, which overlaps with the green color area 502, includes a plurality of different blue color hues. Each location on the UV color map (i.e., UV coordinates) corresponds to a specific color hue of a pixel portion in the UV color space. The remaining color areas (red, orange, yellow, violet, and indigo) are not shown for simplicity. In addition the number of colors shown and their location on the UV color map is merely exemplary.

In the example method 400, a frame of the video is received and the method 400 includes analyzing each pixel portion of the frame. Alternatively, features of the disclosure are implemented by receiving portions of a video other than a video frame (e.g., pixel blocks or multiple frames).

As shown at block 402 in FIG. 4, the method 400 includes receiving a frame of the first video in the YUV color space. As described above, the first video is, for example, received in a RGB color space and then converted to the YUV color space.

As shown at block 404 in FIG. 4, the method 400 includes receiving a key color which represents the background color (e.g., greenish color). The key color is, for example, predetermined (i.e., determined prior to runtime) based on the color of the background screen (e.g., green screen). Alternatively, the key color is dynamically determined during runtime. The key color is common to each pixel portion in the portion of the video (i.e., the frame in the example method 400). The UV key color is shown at location 506 on the UV color map 500. As shown in FIG. 5, the UV key color (at location 506) is located within the green color area 502 and, therefore, includes a primarily greenish color hue. The location 506 of the UV key color shown in FIG. 5 and the greenish color hue of the UV key color is merely exemplary.

The pixel portions of the video frame are analyzed at blocks 406 to 414 in FIG. 4. Each pixel portion of the video frame is compared to a first UV threshold at decision block 406 and a second UV threshold at decision block 410 to determine whether the pixel portion represents the background color, the foreground object, or both the background color and the foreground object. The first and second UV distance thresholds are, for example, determined prior to runtime (e.g., by a user). Alternatively, the first and second UV distance thresholds are dynamically determined. In the example shown at FIG. 4, the first UV distance threshold is 10 and is represented on the UV color map 500 by the inner circle 508. The second UV distance threshold is 144 and is represented on the UV color map 500 by the outer circle 510. UV distance thresholds can, however, include values other than 10 and 144.

As shown at block 406 in FIG. 4, the method 400 includes determining whether a UV distance from a location on the UV color map 500 corresponding to a UV color value of a pixel portion (i.e., the pixel portion color location) to the location 506 of the UV key color (i.e., the key color location) is less than or equal to a UV distance from the first UV distance threshold 508 to the key color location 506. For example, the U and V color values of a first pixel portion of the video frame are read and the pixel portion color location on the UV color map 500 is determined. When the distance from the pixel portion color location to the key color location 506 is determined, at decision block 406, to be less than or equal to the distance from the first UV distance threshold 508 to the key color location 506, the pixel portion is assigned a value=0 at block 408, identifying the pixel portion as a first pixel portion type representing the background color.

When the distance from the pixel portion color location to the key color location 506 is determined, at decision block 406, greater than the distance from the first UV distance threshold 510 to the key color location 506, it is then determined, at decision block 410, whether a UV distance from the pixel portion color location to the key color location is less than or equal to a UV distance from the second UV distance threshold 510 to the key color location 506.

When the distance from the pixel portion color location to the key color location 506 is determined, at decision block 410, to be greater than the distance from the second UV distance threshold 510 to the key color location 506, the pixel portion is assigned a value=255 at block 414, identifying the pixel portion as a second pixel portion type representing the foreground color. When the distance from the pixel portion color location to the key color location 506 is determined, at decision block 410, to be less than or equal to the distance from the second UV distance threshold 510 to the key color location 506, the pixel portion is assigned a value=128 at block 412, identifying the pixel portion as a third pixel portion type representing the background color and the foreground object. The values of 0, 128, and 255 shown in FIG. 4 are merely exemplary values (e.g., flags) to identify the pixel portion by the three pixel portion types. Examples can include any three different values to identify the three pixel portion types.

After a pixel portion is identified as a first pixel portion type at block 408, a second pixel portion type at block 414 or a third pixel portion type at block 412, it is determined, at decision block 416, whether there is another pixel portion in the video frame to be analyzed. If there is another pixel portion in the video frame to be analyzed, the next pixel portion is analyzed using the same process as described above. Otherwise, the method 400 of generating the alpha mask for the pixel portions of the video frame ends at block 418.

Referring back to FIG. 3, when it is determined at decision block 306 that the pixel portion does not correspond to both the foreground and background (e.g., as a first pixel portion type at block 408 in FIG. 4), the pixel portion is identified, at block 316, as a foreground pixel portion (e.g., identified as a second pixel portion type at block 414 in FIG. 4) or a background pixel portion (e.g., identified as a first pixel portion type at block 408 in FIG. 4).

When it is determined at decision block 306 that the pixel portion does correspond to both the foreground and background (e.g., as a third pixel portion type at block 412 in FIG. 4), the method 400 proceeds to blocks 308-314. For pixel portions identified as corresponding to both the foreground and background, it is unknown as to whether the pixel portions correspond to a portion of the video frame which represents the foreground object or the background color. Accordingly, pixel portions are identified as corresponding to both the foreground object and the background color of the video frame and, for example, are pixel portions corresponding to a translucent portion of the video frame (e.g., a translucent foreground object or a translucent portion of the foreground object). These pixel portions are identified as pixel portions to be blended with color information of the foreground object and the background color. The determination of the blended color values of each of these pixel portions to be displayed in the composite video (i.e., blended display values) is now described with regard to blocks 308 to blocks 314 of FIG. 3.

For each pixel portion determined to correspond to both the foreground object and the background color of the video frame (i.e., a blend of the foreground object and the background color), the UV color values of each pixel portion are converted to RGB color values at block 308 of FIG. 3. For example, the UV color values of each pixel portion assigned a value of 128 at block 412 in FIG. 4 are converted to RGB color values. Any one of a plurality of different methods for converting from YUV to RGB known in the art can be used to convert the UV color values of each pixel portion to RGB color values.

As shown at block 310 in FIG. 3, the method 300 includes determining a blending factor for each pixel portion determined to correspond to both the foreground object and the background color of the video frame.

The blending factor of each pixel portion is determined, in RGB color space, by exploiting a plurality of deduced existing conditions. For example, an assumption is made that the foreground object does not include the visible background color. As described above, for the examples described herein, the background color is a greenish color (e.g., a green screen is used as the background for the first video). Accordingly, for this example, an assumption is made that the foreground object does not include the visible greenish color of the green screen.

An assumption is also made that after the background color is removed from each pixel portion, each of the resulting R, G and B values is positive, which is shown below in Equations 1-3.

$$R_{current} - \text{alpha} * R_{background} > 0 \qquad \text{Equation 1}$$

$$G_{current} - \text{alpha} * G_{background} > 0 \qquad \text{Equation 2}$$

$$B_{current} - \text{alpha} * B_{background} > 0 \qquad \text{Equation 3}$$

where alpha is the blending factor, $R_{current}$ is the value of the red component in the pixel portion representing the foreground and the background, $G_{current}$ is the value of the green component in the pixel portion representing the foreground and the background, and $B_{current}$ is the value of the blue component in the pixel portion representing the foreground and the background, $R_{background}$ is the value of the red component in the pixel portion representing the background, $G_{background}$ is the value of the green component in the pixel portion representing the background, and $B_{background}$ is the value of the blue component in the pixel portion representing the background. For example, if the background color is green and is removed from a pixel portion, a value of the a green value (i.e., a positive green value) is still used to compose colors (e.g., pink has the value of R=255, G=105, B=180)

An assumption is further made that after the background color is removed from each pixel portion, the resulting image cannot be greenish. Therefore, the value of the red component is greater than the value of the green component and the value of the blue component is greater than the value of the green component, which is shown below in Equations 4 and 5.

$$G_{current} - alpha*G_{background} < R_{current} - alpha*R_{background} \quad \text{Equation 4}$$

$$G_{current} - alpha*G_{background} < B_{current} - alpha*B_{background} \quad \text{Equation 5}$$

An assumption is also made that because the background is a single color, the background color can be substituted with the key color. Accordingly, by replacing the value of the red component representing the background (i.e., $R_{background}$) with the value of the red component of the key color (i.e., $R_{keycolor}$), replacing the value of the green component representing the background (i.e., $G_{background}$) with the value of the green component of the key color (i.e., $G_{keycolor}$), and replacing the value of the blue component representing the background (i.e., $B_{background}$) with the value of the blue component of the key color (i.e., $B_{keycolor}$), Equations 1-3 can be rewritten to solve for the upper constraint blending factor value for the red, green and blue components, as shown below in Equations 6-8.

$$alpha01 = R_{current}/R_{keycolor} \quad \text{Equation 6}$$

$$alpha02 = G_{current}/G_{keycolor} \quad \text{Equation 7}$$

$$alpha03 = B_{current}/B_{keycolor} \quad \text{Equation 8}$$

In Equations 6-8, alpha01 is the upper constraint blending factor value for the red component, alpha02 is the upper constraint blending factor value for the green component and alpha03 is the upper constraint blending factor value for the blue component.

Because, as described above, the UV key color is a known value (i.e., predetermined or dynamically determined), the key color values (i.e., $R_{keycolor}$, $G_{keycolor}$ and $B_{keycolor}$) and the current color values ($R_{current}$, $G_{current}$ and $B_{current}$) are determinable from formulas used to the convert from the YUV color space to the RGB color space. Accordingly, the upper constraint blending factor values alpha01, alpha02 and alpha03 are also determinable from the determined key color values and current color values.

The blending factor alpha is selected from two selectable alpha values, alpha0 and alpha1. The first selectable value alpha0 is determined as the smaller of the three upper constraint blending factor values alpha01, alpha02 and alpha03, shown in Equations 6-8.

The second selectable value alpha1 is determined from one of the values, alpha11 and alpha12, shown below in Equations 9 and 10.

$$alpha11 = (G_{current} - B_{current})/(G_{keycolor} - B_{keycolor}) \quad \text{Equation 9}$$

$$alpha12 = (G_{current} - R_{current})/(G_{keycolor} - R_{keycolor}) \quad \text{Equation 10}$$

The value alpha11 in Equation 9 is a value in which the blue component of the pixel portion is greater than or equal to the value of the green component of the pixel portion. The value alpha12 in Equation 10 is a value in which the red component of the pixel portion is greater than or equal to the value of the green component of the pixel portion. The second selectable value alpha1 is determined as the larger of the values alpha11 and alpha12. The blending factor alpha is then selected as the smaller of the two selectable alpha values, alpha0 and alpha1.

Referring back to FIG. 3, a blended display value is determined for each pixel portion, as shown at block 312 of method 300. That is, a blended display value is determined for each color component (i.e., the red component, the green component and the blue component in the RGB color space) of the pixel portion based on the blending factor alpha, as shown at block 310 in FIG. 3.

For example, as shown below in Equations 11-13, blended display values $R_{display}$, $G_{display}$ and $B_{display}$ are determined for each color component of the blended pixel portion as the difference between the corresponding color component current value ($R_{current}$, $G_{current}$ and $B_{current}$) in the pixel portion and a factor of the blending factor alpha and the key color of the corresponding color component (alpha*$R_{keycolor}$, alpha*$G_{keycolor}$ and alpha*$B_{keycolor}$).

$$R_{display} = R_{current} - alpha*R_{keycolor} \quad \text{Equation 11}$$

$$G_{display} = G_{current} - alpha*G_{keycolor} \quad \text{Equation 12}$$

$$B_{display} = B_{current} - alpha*B_{keycolor} \quad \text{Equation 13}$$

As shown at block 314 in FIG. 4, the method 400 includes using the blended pixel portion for the composite video which displays the foreground portion of the first video and the replacement content (e.g., second video or CGI). In the composite video, the blended display values $R_{display}$, $G_{display}$ and $B_{display}$ of each pixel portion identified as a portion of the first video which correspond to both the foreground object and the background object (e.g., pixel portions identified at block 412 in FIG. 4) are used to display the pixel portions.

The UV color values of each pixel portion identified as a portion of the first video corresponding to the foreground object (e.g., pixel portions identified at block 414 in FIG. 4) are converted to RGB values and the RGB color values are used to display these pixel portions in the composite video.

The pixel portions identified as portions of the first video which correspond to the background color (e.g., pixel portions identified at block 408 in FIG. 4) are replaced with the background content (e.g., the second video or CGI) in the composite video. For example, the pixel portions identified as portions of the first video corresponding to the background color are made transparent (i.e., not visible) and the pixel portions of the second video or CGI are displayed in the composite video.

It should be understood that many variations are possible based on the disclosure herein. Although features and elements are described above in particular combinations, each feature or element can be used alone without the other features and elements or in various combinations with or without other features and elements.

The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements features of the disclosure.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A video keying processing device comprising:
   memory configured to store data; and
   a processor configured to:
      determine, which pixel portions, in a YUV color space of a first video comprising a foreground object and a background color, represent the foreground object and the background color of the first video based on a distance from the location of a color of a corresponding pixel portion to a location of the background color in the YUV color space;
      for each pixel portion of the first video determined to represent the foreground object and the background color:
         convert YUV values of the pixel portion to red-green-blue (RGB) color component values; and
         determine a blended display value for each RGB color component of the pixel portion based on a blending factor; and
      generate a composite video for display using the blended display values of each pixel portion determined to represent the foreground object and the background color.

2. The processing device according to claim 1, wherein the processor is further configured to determine the blending factor of the pixel portion based on the RGB values.

3. The processing device according to claim 1, wherein the processor is configured to:
   convert, a YUV key color value, representing the background color, to an RGB key color value; and
   determine the blending factor for each pixel portion based on the RGB key color value.

4. The processing device according to claim 1, wherein the processor is further configured to determine the blending factor of the pixel portion based on a first selectable value and a second selectable value,
   the first selectable value is determined from upper constraint blending factor values for each RGB color component, and
   the second selectable value is determined as one the blue (B) color component value of the pixel portion being greater than or equal to the green (G) color component value of the pixel portion and the red (R) color component value of the pixel portion being greater than or equal to the G color component value of the pixel portion.

5. The processing device according to claim 4, wherein the processor is further configured to determine the blending factor of the pixel portion to be a lesser of the first selectable value and the second selectable value.

6. The processing device according to claim 4, wherein the processor is further configured to determine the first selectable value to be a lesser of the upper constraint blending factor values.

7. The processing device according to claim 4, wherein the processor is further configured to determine the second selectable value to be a larger of the value in which the B component of the pixel portion is greater than or equal to the value of the G component of the pixel portion and the value in which the R component of the pixel portion is greater than or equal to the value of the G component of the pixel portion.

8. The processing device according to claim 1, wherein the processor is further configured to determine the blending factor of each pixel portion using a plurality of deduced conditions comprising:
   the foreground object does not include the background color;
   after the background color is removed from each pixel portion, the RGB color component values are positive; and
   the background color is a single color.

9. The processing device according to claim 1, wherein the processor is further configured to separate the pixel portions of the first video into one of a first pixel portion type representing the foreground object, a second pixel portion type representing the background color and a third pixel portion type representing the foreground object and the background color.

10. A video keying processing method comprising:
   determining, which pixel portions, in a YUV color space of a first video comprising a foreground object and a background color, represent the foreground object and the background color of the first video based on a distance from the location of a color of a corresponding pixel portion to a location of the background color in the YUV color space;
   for each pixel portion of the first video determined to represent the foreground object and the background color:
      converting YUV values of the pixel portion to red-green-blue (RGB) color component values;
      determining a blending factor of the pixel portion based on the RGB color component values; and
      determining a blended display value for each RGB color component of the pixel portion based on the blending factor; and
   generating a composite video for display using the blended display values of each pixel portion determined to represent the foreground object and the background color.

11. The method according to claim 10, further comprising separating the pixel portions of the first video into one of a first pixel portion type representing the foreground object, a second pixel portion type representing the background color and a third pixel portion type representing the foreground object and the background color.

12. The method according to claim 10, further comprising:
   converting a YUV key color value, representing the background color, to an RGB key color value; and
   determining the blending factor for each pixel portion based on the RGB key color value.

13. The method according to claim 12, further comprising generating the composite video by blending the foreground object with background content using the blended display values.

14. The method according to claim 12, further comprising determining the blending factor of the pixel portion based on a first selectable value and a second selectable value, wherein
   the first selectable value is determined from upper constraint blending factor values for each RGB color component, and
   the second selectable value is determined as one the blue (B) color component value of the pixel portion being greater than or equal to the green (G) color component value of the pixel portion and the red (R) color component value of the pixel portion being greater than or equal to the G color component value of the pixel portion.

15. The method according to claim 14, further comprising determining the blending factor of the pixel portion to be a lesser of the first selectable value and the second selectable value.

16. The method according to claim 14, further comprising determining the first selectable value to be a lesser of the upper constraint blending factor values.

17. The method according to claim 14, further comprising determining the second selectable value to be a larger of the value in which the B component of the pixel portion is greater than or equal to the value of the G component of the pixel portion and the value in which the R component of the pixel portion is greater than or equal to the value of the G component of the pixel portion.

18. A video keying processing device comprising:
memory configured to store data; and
a processor configured to:
  receive a first video comprising a foreground object and a background color;
  receive background display content comprising at least one of a second video and computer generated imagery (CGI);
  generate, in a YUV color space using a key color representing the background color, an alpha mask to separate pixel portions of the first video into pixel portions representing the foreground object, pixel portions representing the background color and pixel portions representing the foreground object and the background color based on a distance from the location of a color of a corresponding pixel portion to a location of the key color in the YUV color space;
  for each pixel portion representing the foreground object and the background color:
    determine, in a red-green-blue (RGB) color space, a blending factor using the key color and color values of the pixel portion; and
    determine a blended display value for each RGB color component of the pixel portion based on the blending factor and the key color; and
  generate a composite video for display using the blended display values of each pixel portion determined to represent the foreground object and the background color.

19. The processing device according to claim 18, wherein the processor is further configured to determine the blending factor of the pixel portion based on a first selectable value and a second selectable value,
  the first selectable value is determined from upper constraint blending factor values for each RGB color component, and
  the second selectable value is determined as one of a blue (B) color component value of the pixel portion being greater than or equal to a value of a green (G) color component value of the pixel portion and a red (R) color component value of the pixel portion being greater than or equal to the G color component value of the pixel portion.

20. The processing device according to claim 18, wherein the processor is further configured to, for each pixel portion representing the foreground object and the background color:
  convert YUV color values of the pixel portion to RGB color values of the pixel portion; and
  convert a YUV key color value to an RGB key color value.

* * * * *